US011210569B2

(12) United States Patent
Qian et al.

(10) Patent No.: US 11,210,569 B2
(45) Date of Patent: Dec. 28, 2021

(54) METHOD, APPARATUS, SERVER, AND USER TERMINAL FOR CONSTRUCTING DATA PROCESSING MODEL

(71) Applicant: Advanced New Technologies Co., Ltd., Grand Cayman (KY)

(72) Inventors: Jiang Qian, Zhejiang (CN); Changhua He, Zhejiang (CN); Xi Hu, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/106,833

(22) Filed: Nov. 30, 2020

(65) Prior Publication Data

US 2021/0081725 A1 Mar. 18, 2021

Related U.S. Application Data

(63) Continuation of application No. PCT/CN2019/091853, filed on Jun. 19, 2019.

(30) Foreign Application Priority Data

Aug. 7, 2018 (CN) .......................... 201810889565.8

(51) Int. Cl.
*G06K 9/62* (2006.01)
*G06N 20/00* (2019.01)

(52) U.S. Cl.
CPC .......... *G06K 9/6277* (2013.01); *G06K 9/623* (2013.01); *G06K 9/6256* (2013.01); *G06N 20/00* (2019.01)

(58) Field of Classification Search
CPC . G06T 2207/20221; G06T 2207/30168; G06T 2207/30242; G06T 3/4038; G06T 5/50; G06T 7/0002; G06T 7/13; G06T 7/136; G06T 7/174; G06T 7/90
See application file for complete search history.

(56) References Cited

U.S. PATENT DOCUMENTS

| 10,066,936 | B2 * | 9/2018 | Turovets | ............ G01N 21/4788 |
| 10,452,992 | B2 * | 10/2019 | Lee | ........................ G06N 20/00 |
| 10,643,144 | B2 * | 5/2020 | Bowers | .................. G06N 20/00 |

(Continued)

FOREIGN PATENT DOCUMENTS

| CN | 105550746 A | 5/2016 |
| CN | 107766940 A | 3/2018 |

(Continued)

OTHER PUBLICATIONS

International Search Report in Application No. PCT/CN2019/091853, from the China National Intellectual Property Administration, dated Sep. 20, 2019.

(Continued)

*Primary Examiner* — Ian L Lemieux
(74) *Attorney, Agent, or Firm* — Finnegan, Henderson, Farabow, Garrett & Dunner, LLP

(57) ABSTRACT

A method for constructing a data processing model, includes: acquiring a model description parameter and sample data of a target data processing model; determining a base model according to the model description parameter and the sample data; and training the base model according to the sample data to obtain the target data processing model.

16 Claims, 10 Drawing Sheets

(56) References Cited

U.S. PATENT DOCUMENTS

| | | | |
|---|---|---|---|
| 10,782,988 B2* | 9/2020 | Dai | G06F 9/45558 |
| 2011/0313953 A1 | 12/2011 | Lane et al. | |
| 2012/0041920 A1 | 2/2012 | Kim et al. | |
| 2015/0379424 A1* | 12/2015 | Dirac | G06N 20/00 |
| | | | 706/12 |
| 2017/0178020 A1* | 6/2017 | Duggan | G06F 9/50 |
| 2017/0178027 A1* | 6/2017 | Duggan | G06F 9/50 |
| 2018/0374098 A1* | 12/2018 | Zhang | G06Q 20/4016 |
| 2019/0188000 A1* | 6/2019 | Chen | G06F 9/5016 |
| 2019/0188588 A1* | 6/2019 | Yang | G06F 16/9535 |
| 2019/0205701 A1* | 7/2019 | Huang | G06N 5/041 |
| 2019/0213503 A1* | 7/2019 | Navratil | G06F 16/583 |
| 2019/0221202 A1* | 7/2019 | Li | G06F 17/16 |
| 2019/0303768 A1* | 10/2019 | Zhang | G06N 3/0454 |
| 2019/0354850 A1* | 11/2019 | Watson | G06N 3/08 |
| 2019/0370665 A1* | 12/2019 | David | G06N 3/04 |
| 2020/0026953 A1* | 1/2020 | Shao | G06N 3/08 |
| 2020/0034740 A1* | 1/2020 | Yang | H04L 9/0618 |
| 2020/0302234 A1* | 9/2020 | Walters | G06K 9/628 |
| 2021/0042602 A1* | 2/2021 | Zhao | G06N 3/04 |

FOREIGN PATENT DOCUMENTS

| | | |
|---|---|---|
| CN | 108021986 A | 5/2018 |
| CN | 108170909 A | 6/2018 |
| CN | 108197664 A | 6/2018 |

OTHER PUBLICATIONS

Written Opinion of the International Search Authority in International Application No. PCT/CN2019/091853, dated Sep. 20, 2019.
Extended European Search Report in European Application No. 19847397.7 dated May 25, 2021.

* cited by examiner

METHOD, APPARATUS, SERVER, AND USER TERMINAL FOR CONSTRUCTING DATA PROCESSING MODEL

CROSS-REFERENCE TO RELATED APPLICATIONS

This application is a continuation application of International Application No. PCT/CN2019/091853, filed on Jun. 19, 2019, which is based upon and claims priority to Chinese Patent Application No. 201810889565.8, filed on Aug. 7, 2018, the entire content of all of which is incorporated herein by reference.

TECHNICAL FIELD

The present specification relates generally to the field of Internet technologies, and in particular, to a method, an apparatus, a server, and user terminal for constructing a data processing model.

BACKGROUND

With the development of artificial intelligence technologies, a data processing method that constructs a corresponding data processing model through machine learning, and then uses the constructed data processing model to perform specific data processing on target data is widely used in increasingly more fields.

At present, when constructing the above data processing model based on an existing method, a user needs to simultaneously design and perform a test analysis and other operations (for example, including feature engineering, model selecting, model parameter searching, and so on) on a plurality of possible model analyses through a corresponding code program or the like to determine a suitable model that meets processing requirements of target data as a base model, and the base model is trained to construct a required target data processing model. During the implementation of the above method, the user is required to have relatively high professional capabilities (for example, testing of a model structure, data analysis on the model, and so on), and each time a data processing model is constructed, the user needs to manually perform a plurality of tests to find a suitable base model, which may increase the complexity of the processing process and affect the processing efficiency.

SUMMARY

According to a first aspect of embodiments of the specification, a method for constructing a data processing model, includes: acquiring a model description parameter and sample data of a target data processing model; determining a base model according to the model description parameter and the sample data; and training the base model according to the sample data to obtain the target data processing model.

According to a second aspect of embodiments of the specification, a data processing method, includes: acquiring to-be-processed target data; and invoking a target data processing model to process the target data, wherein the target data processing model is obtained by determining a base model according to a model description parameter and sample data of the target data processing model that are acquired and then training the base model according to the sample data.

According to a third aspect of embodiments of the specification, a data processing method, includes: displaying a data input interface; and receiving a model description parameter and sample data of a target data processing model input by a user on the data input interface, wherein the model description parameter and the sample data are configured to determine a base model, and the base model is configured to establish the target data processing model.

According to a fourth aspect of embodiments of the specification, a server includes: a processor and a memory storing instructions executable by the processor, wherein the processor is configured to: acquire a model description parameter and sample data of a target data processing model; determine a base model according to the model description parameter and the sample data; and train the base model according to the sample data to obtain the target data processing model.

According to a fifth aspect of embodiments of the specification, a user terminal includes: a processor; and a memory storing instructions executable by the processor, wherein the processor is configured to: display a data input interface; and receive a model description parameter and sample data of a target data processing model input by a user on the data input interface, wherein the model description parameter and the sample data are configured to determine a base model, and the base model is configured to establish the target data processing model.

According to a sixth aspect of embodiments of the specification, a non-transitory computer-readable storage medium has stored thereon instructions that, when executed by a processor of a device, cause the device to perform a method for constructing a data processing model, the method including: acquiring a model description parameter and sample data of a target data processing model; determining a base model according to the model description parameter and the sample data; and training the base model according to the sample data to obtain the target data processing model.

According to the embodiments provided in the present specification, by acquiring a model description parameter in a targeted manner, a server can accurately determine a modeling requirement of a user based on the model description parameter, automatically match the modeling requirement of the user to a suitable model as a base model, and then construct a corresponding data processing model, so that it is unnecessary for the user to test and analyze tediously to determine a suitable base model, thereby reducing the operational difficulty of the user and improving the processing efficiency.

BRIEF DESCRIPTION OF THE DRAWINGS

The accompanying drawings, which are incorporated in and constitute a part of the specification, illustrate embodiments consistent with the specification and, together with the description, serve to explain the principles of the specification.

DETAILED DESCRIPTION

Figure 1:
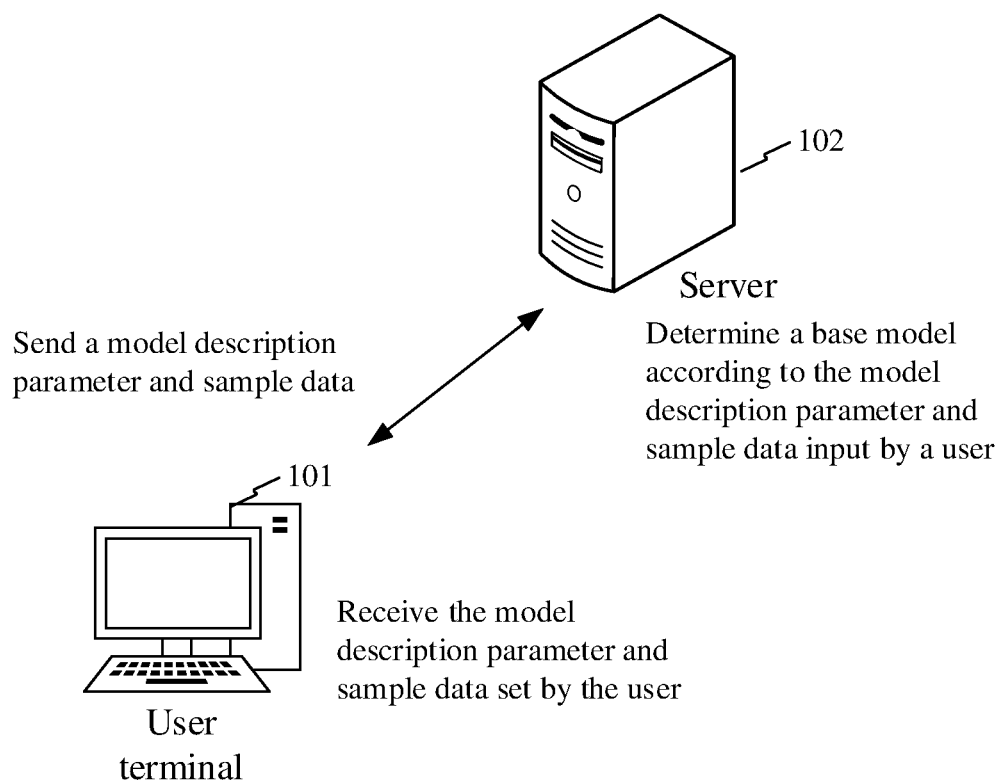
FIG. 1 is a schematic diagram of a system for constructing a data processing model according to an embodiment.

Embodiments will be described in detail here, examples of which are shown in the drawings. When the following description refers to the accompanying drawings, unless otherwise indicated, the same numerals in different drawings represent the same or similar elements. The implementations described in the following example embodiments do not represent all implementations consistent with the specification. Rather, they are only examples of apparatuses and methods consistent with some aspects of the specification as recited in the appended claims.

Based on an existing method for constructing a data processing model, a user often needs to perform tests and analyses (which may include, for example, feature engineering, model selecting, model parameter searching, and other steps) by coding or in other manner in the process of constructing a target data processing model through machine learning, and determine, from a variety of possible models, a suitable model as a base model (or referred to as an initial model). However, the above determining a suitable model as a base model has relatively high professional requirements for a user, and the operational difficulty is relatively high. For example, the user may be required to have high data analysis capabilities and programming knowledge in order to interpret and analyze underlying data (for example, program code and the like) fed back based on each test model to determine a degree of applicability of each test model to to-be-processed target data. In addition, since the user is required to find a suitable base model by himself/herself, the implementation process is relatively complicated and the processing efficiency is relatively low.

In view of the above, embodiments of the present specification may separate a description of a model and a determination of a relevant base model. For example, on a user-oriented side, a user can be allowed to provide a relatively simple model description parameter to represent requirements and limitations of the user for a required base model, and then a platform server can automatically match the model description parameter to a suitable model as a base model for the user, to enable the user to construct a required data processing model through training of the base model, so that it is unnecessary for the user to test and analyze tediously to determine a suitable base model, thereby reducing the operational difficulty of the user and improving the processing efficiency.

Embodiments of the specification provide a method for constructing a data processing model. The method for constructing a data processing model is applicable to a system including a server and a user terminal. FIG. 1 is a schematic diagram of a system for constructing a data processing model according to an embodiment. As shown in FIG. 1, the system may include a user terminal 101 and a server 102. The user terminal 101 and the server 102 are coupled to each other for data interaction.

Based on the above system, a user may set, through the user terminal 101, a model description parameter that meets a modeling requirement, and input corresponding sample data. The server 102 may receive the model description parameter and sample data sent by the user terminal 101, and select a suitable model as a base model and a corresponding model parameter according to the model description parameter and the sample data set by the user, and then may provide the base model and the model parameter to the user, so that the user can directly use the base model to train and construct a target data processing model. The server 102 can also use the sample data input by the user to automatically train and construct the target data processing model based on the base model and the model parameter.

In an embodiment, the server 102 may be a background service server with data analysis, processing, and data communication functions. The server 102 may be an electronic device with data computation, storage, and network interaction functions; or may be implemented by software running in the electronic device and providing support for data processing, storage, and network interaction. A number of servers is not limited in the embodiment. The server 102 may be one or more servers, or a server cluster formed by multiple servers.

In an embodiment, the user terminal 101 may be a port device with data input, data display, and data communication functions. For example, the user terminal 101 may be a desktop computer, a tablet computer, a notebook computer, a smart phone, a digital assistant, a smart wearable device, a shopping guide terminal, a television with a network access function, or the like. The user terminal 101 may be installed with a software application, a graphical interface, or the like that is runnable in the electronic device.

The user may use the system to perform the method for constructing a data processing model, to easily and efficiently train and construct a target data processing model.

For example, the user wants to construct a data processing model capable of identifying the gender of a character in a picture. If directly based on an existing method for constructing a data processing model, the user needs to test and analyze a variety of possible models by himself/herself to select a model suitable for identifying the gender of the character in the picture as a base model, and then train and construct a specific data processing model. For the user, the implementation is relatively tedious, the operation is difficult, and the processing efficiency is also relatively low.

Figure 2:
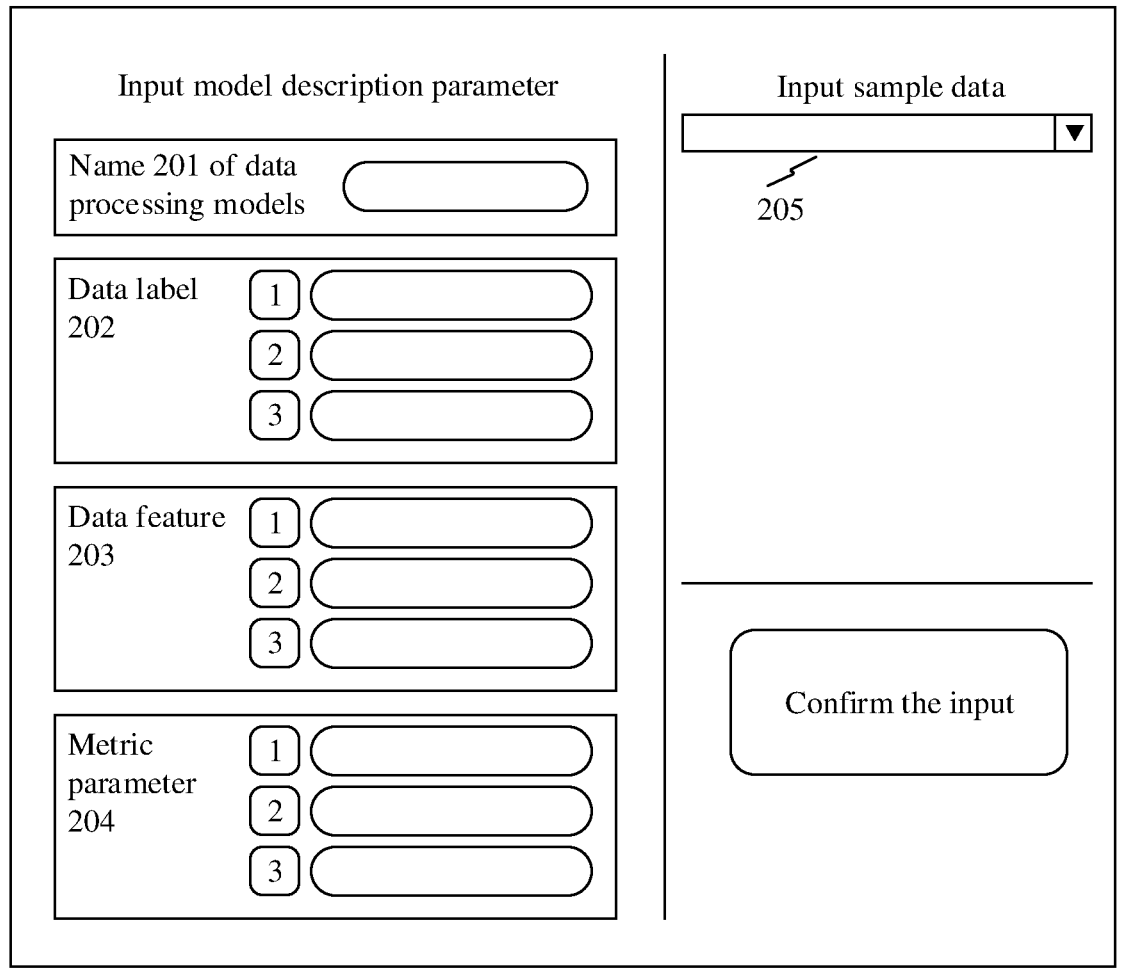
FIG. 2 is a schematic diagram of a data input interface displayed by using a method for constructing a data processing model according to an embodiment.

Based on the method for constructing a data processing model according to the embodiment of the present specification, a platform server, such as the server 102, may generate, based on a predefined model description rule, a data input interface for the user to input a model description parameter, and send the data input interface to the user terminal 101. The user terminal 101 may display the above data input interface to the user. FIG. 2 is a schematic diagram of a data input interface displayed by using the method for constructing a data processing model according to an embodiment. As shown in FIG. 2, a plurality of model description parameters to be set by the user are displayed on the data input interface.

The model description parameters may be parameter data that is set by the user and is capable of effectively representing data processing requirements and/or user customization requirements of a target data processing model to be constructed. In this way, even if the user does not have enough understanding of the specific underlying data, or has relatively poor professional capabilities, the user can easily and efficiently set his/her own modeling requirement through the model description parameters according to data processing to be implemented by the target data processing model to be constructed. Moreover, the parameter data conforms to a model description rule. That is, the server 102 may display the corresponding data input interface to the user through the user terminal 101 based on the model description rule, so that the user can set specific model description parameters according to a format corresponding to the model description rule and then can accurately identify and determine specific information included in the model description parameters. A model that meets implementation requirements and/or user customization requirements (also referred to as a suitable model) of the target data processing model to be constructed can be automatically found and matched for the user on the basis of the above information to serve as a base model.

Referring to FIGS. 1 and 2, the model description parameters may include: a name 201 of the target data processing model (which may be denoted as model_name), a data label 202 (which may be denoted as label), a data feature 203 (which may be denoted as feature), an evaluation metric 204 (which may be denoted as eval_metrics), and the like. The model description parameters listed above are only for illustrative purposes. According to a specific situation of the user and specific characteristics of the target data processing model to be constructed, other types of parameter data such as a model type may also be included in the model description parameters, which is not limited in the present specification.

The name 201 of the target data processing model may be an identification symbol of the data processing model that the user wants to construct, for example, an A model, a model for identifying the gender of a character in a picture, or the like.

The data label 202 may be a processing result obtained by the target data processing model by processing the target data. For example, it may be result data (e.g., corresponding to data of column y in the data processing model) predicted or identified by the data processing model. For example, it may be the result "male" or "female" obtained by identifying the gender of a character in a picture through the data processing model.

The data feature 203 may be a data feature used as a processing basis in the process of processing the target data by the target data processing model. For example, it may be a data feature (e.g., corresponding to data of column x in the data processing model) extracted by the data processing model from the sample data and configured to obtain a prediction or identification result. For example, it may be a degree of thickness of the hair at the position of a human face in the picture, a bulging amplitude at the position of a human neck in the picture, a color value at the position of the human face in the picture, and so on.

The evaluation metric 204 (also referred to as an evaluation parameter) may be a parameter capable of evaluating the performance, such as data processing precision and processing efficiency, of the target data processing model.

For different types of data processing models, corresponding evaluation metrics may be different. For a classification model, the evaluation metric 204 may include an Area Under roc Curve (AUC) parameter. The metric is an evaluation metric for measuring a classification effect of a model. Generally, a larger corresponding AUC metric value indicates a better classification effect and a higher precision. In addition, for the classification model, the evaluation metric 204 may further include: accuracy, average accuracy, logarithmic loss function, precision-recall, confusion matrix, and the like. For a regression model, the evaluation metric 204 may include: square root error, Quantiles of Errors, Almost Correct Predictions, and so on. The evaluation metrics listed above are only examples. Other suitable performance parameters may be selected according to specific characteristics of data processing to which the target data processing model is applied and specific requirements of the user. The present specification makes no limitation in this regard.

For example, the user may set the name to "WM" in a name field of the data processing model in the data input interface presented by the user. In a data label field, data label 1 is set to "man" (for male) and data label 2 is set to "woman" (for female) respectively. In a data feature field, data feature 1 is set to a color value of a human face in the picture, data feature 2 is set to a smoothness value of the human face in the picture, and data feature 3 is set to a bulging amplitude at the position of a human neck in the picture. The evaluation metric is set to "AUC" in the evaluation metric field.

In addition, a sample data input interface 205 may be further provided on the data input interface, through which the user may import corresponding sample data. For example, the above sample data may be picture data including a character.

The user terminal 101 receives a model description parameter and sample data set by the user through the data input interface, and sends the data to the server 102, which may be a platform server, through a network.

After receiving the model description parameter and the sample data, the server 102 may automatically perform tests and analyses for the user according to the model description parameter and in conjunction with the sample data, and then determine a model that meets user requirements as a base model (also referred to as an initial model) for the user; and then the base model may be trained using the sample data to construct a target data processing model required by the user and capable of identifying the gender of the character in the picture.

In an embodiment, after receiving the model description parameter, the server 102 may first parse the model description parameter to determine specific data of the parameters, such as a name of the target data processing model, a data label, a data feature, and an evaluation metric set by the user. For example, it may be determined by parsing that the name of the target data processing model set by the user is "WM;" there are two data labels, and data label 1 is "man" and data feature 2 is "woman;" there are three data features, wherein data feature 1 is a color value of a human face in the picture, data feature 2 is a smoothness value of the human face in the picture, and data feature 3 is a bulging amplitude at the position of a human neck in the picture; and there is an evaluation metric being an AUC parameter.

Furthermore, by analyzing the above data labels, the server 102 may find that the number of the data labels is 2 instead of 1, and the target data processing model needs to determine whether the target data corresponds to "man" or "woman" Therefore, it can be determined that the data processing to be performed by the target data processing model is data processing of a classification type. Then, preset model types may be searched to determine that a model matching the data processing of the above classification type is the classification type. Therefore, the model type of the base model of the target data processing model is determined as the classification type.

After the model type of the base model is determined as the classification type, the server 102 may search a preset model database, and select a plurality of models by filtering models that meet the model type of the base model (that is, the classification model) to serve as candidate models, so that a model with better effects can be subsequently determined from the above plurality of candidate models to serve as the base model.

In an embodiment, the acquired plurality of models that meet the model type of the base model may be further filtered, so as to select, as far as possible, models with higher probability and relatively good effects by filtering a number of models that meet the model type of the base model to serve as candidate models for a subsequent test analysis, exclude interference models, and avoid a waste of time and resources for testing and analyzing some models with poor effects.

Figure 3:
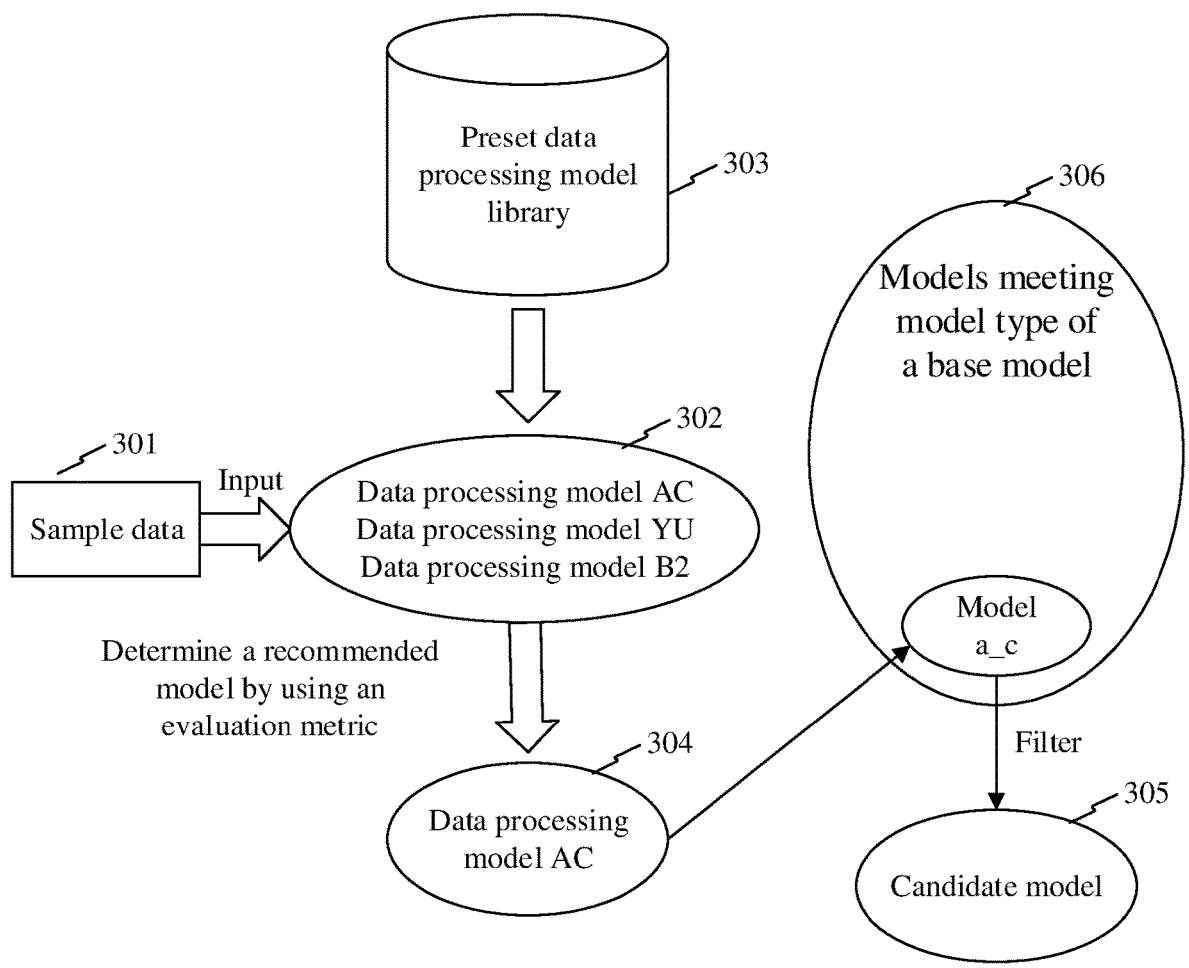
FIG. 3 is a schematic diagram of a method for filtering candidate models by using a method for constructing a data processing model according to an embodiment.

FIG. 3 is a schematic diagram of a method for filtering candidate models by using the method for constructing a data processing model, according to an embodiment. The method may accurately and quickly find better and more suitable candidate models. Referring to FIG. 3, sample data 301 may be used as an input to be input into trained data processing models 302 (for example, data processing model AC, data processing model YU, and data processing model B2) from a preset data processing model library 303, where base models applied in the trained data processing models 302 meet the model type of the above base model, to obtain data processing results (for example, prediction results) of the data processing models. Evaluation metrics of the data processing models are obtained by conducting statistics according to the data processing results of the data processing models. Then, for example, the data processing model AC whose evaluation metric is similar to or identical with that of the target data processing model is selected as a recommended model 304 according to the evaluation metric of the target data processing model; and base model a_c to which the recommended model AC is applied is determined as a candidate model 305. In addition, a plurality of models 306 that meet the model type of the base model may be further filtered according to a data type of the sample data.

Figure 4:
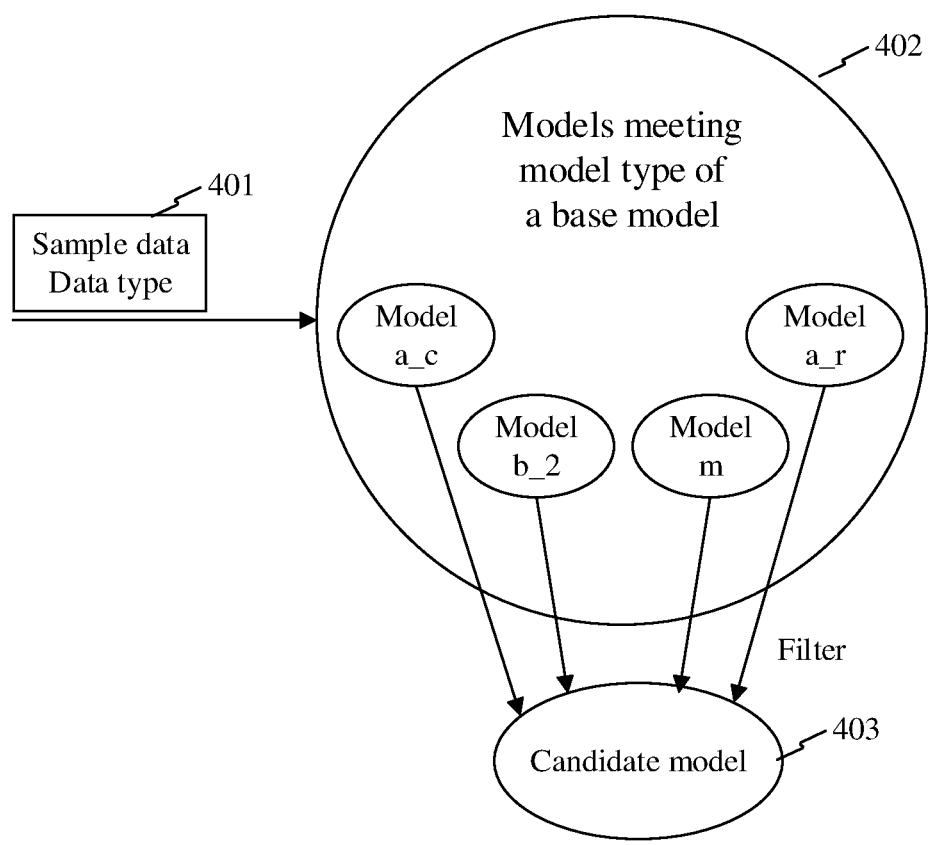
FIG. 4 is a schematic diagram of a method for filtering candidate models by using a method for constructing a data processing model according to an embodiment.

FIG. 4 is a schematic diagram of a method for filtering candidate models by using a method for constructing a data processing model according to an embodiment. Referring to FIG. 4, for example, a data type 401 of the sample data may be first determined as picture data. Furthermore, it may be determined that the target data to be processed subsequently by the target data processing model is also picture data. As for models, among different types of models, some have higher accuracy in analyzing and processing picture data, and some have higher accuracy in analyzing and processing text data. In order to improve the accuracy of a data processing model constructed subsequently, models 402 that match the picture data (or are suitable for processing the picture data) may be selected by filtering the plurality of models that meet the model type of the base model to serve as candidate models 403. For example, models a_c, a_r, b_2, m, and the like may be extracted as candidate models.

After determining a plurality of candidate models, the server may establish a pre-trained model for each of the plurality of candidate models, and then use the pre-trained model for a test analysis to select a model having a better effect, suitable for target data processing, and meeting user requirements to serve as the base model of the target data processing model.

For example, the server may first extract a predetermined proportion of the sample data from the acquired sample data to serve as test data; then pre-process the test data to obtain processed test data; select, based on the data feature, feature data from the processed test data; and train each of the plurality of candidate models respectively according to the feature data to obtain the pre-trained model.

For example, the server may randomly extract 10% of the sample data to serve as test data. The value may be set according to specific conditions. For example, if the accuracy of the determined base model is intended to be improved, the proportion value may be increased to increase the amount of the test data. If the determination of the base model is intended to be sped up, the proportion value may be decreased to reduce the amount of the test data. The specification makes no limitation in this regard.

The above pre-processing may include dimension reduction processing, cleaning processing, and the like. A suitable pre-processing manner may be selected according to specific application scenarios and requirements. The specification makes no limitation in this regard.

In an embodiment, the server may extract, in a targeted manner, the part of the data representing the color value of the human face in the picture of the test data as first feature data according to data feature 1, the color value of the human face in the picture. Similarly, the part of the data in the test data that represents the smoothness value of the human face and the bulging amplitude at the position of the human neck may be extracted respectively as second feature data and third feature data. Furthermore, the plurality of candidate models may be trained according to the first feature data, the second feature data, and the third feature data respectively, so as to obtain a plurality of relatively simple pre-trained models. Each pre-trained model is obtained based on a candidate model.

After the plurality of pre-trained models are obtained, the server may further determine, according to the pre-trained models, model parameters corresponding to the pre-trained models through a model parameter search. The above model parameters may be related operating parameters to be involved in the operation of the pre-trained models. For example, the above model parameters may include: the number of times of iterations, a convergence condition, a running time, and so on.

Further, the server may test the pre-trained models. For example, adaptabilities of the pre-trained models and the model parameters may be determined according to the evaluation metrics; and then the base model is determined from the plurality of candidate models according to the adaptabilities of the pre-trained models. Therefore, a candidate model suitable for a target data processing scenario, with high accuracy, or meeting user requirements may be selected from the plurality of candidate models to serve as a base model.

The adaptability may be configured to represent a degree of applicability of a pre-trained model and a model parameter in the data processing on the sample data. In general, for a pre-trained model, a higher adaptability value means that the pre-trained model achieves a higher accuracy and a better effect in performing data processing on the target data. Correspondingly, the candidate model corresponding to the pre-trained model is also more effective in the data processing on the target data.

In an embodiment, part of the test data may be randomly extracted to test the established pre-trained models to obtain test results. Statistics is conducted on the AUC parameters of the pre-trained models according to the test results, and the adaptability values of the pre-trained models are determined according to the AUC parameters. For example, if the AUC parameter of a certain pre-trained model is relatively high, the precision of the pre-trained model is relatively high, the applicability in the data processing on the target data is also relatively good, and the adaptability correspondingly obtained is also relatively very high. Then, the plurality of pre-trained models are sorted according to the adaptabilities, and a candidate model corresponding to the pre-trained model with the highest adaptability value (that is, a suitable model) is selected as the base model. In some embodiments, a plurality of candidate models corresponding to a preset number of pre-trained models with top adaptability values or candidate models corresponding to pre-trained models whose adaptability values are greater than a preset adaptability threshold may also be selected to be combined to obtain a combined model, and the combined model is used as the base model.

For example, pre-trained models 1, 2, 3, 4, 5, and 6 may be used to respectively perform classification identification on the plurality of same pieces of randomly extracted picture data to obtain identification results of the pre-trained models for the picture data, which are used as test results of the pre-trained models. Statistics is then conducted on the AUC parameters of the pre-trained models according to the above test results. The adaptability values of the pre-trained models are further determined according to the AUC parameters. By comparing the adaptability values of the pre-trained models, it is found that the adaptability value of pre-trained model 1 is the highest. Therefore, the candidate model corresponding to pre-trained model 1 may be determined as the base model of the target data processing model.

In an embodiment, the adaptability of each pre-trained model may be further determined in the following manner to evaluate an effect of the corresponding candidate model: performing a parameter search and a structure search according to the pre-trained model and the model parameter to obtain a search result; and determining an adaptability of the pre-trained model and the model parameter according to the search result and the evaluation metric. For example, performing the parameter search and the structure search according to the pre-trained model and the corresponding model parameter may include: performing the parameter search and the structure search through at least one of the following algorithms: a Monte Carlo algorithm, a grid algorithm, a Bayesian algorithm, a genetic algorithm, and the like.

The adaptability of the pre-trained model may be determined by selecting a suitable manner according to a specific situation. The present specification makes no limitation in this regard.

In the above manner, the server may accurately match the model description parameters simply set by the user to a base model suitable for the target data processing model to be constructed by the user, and feed the base model back to the user. Furthermore, the base model may be trained using the sample data to construct a WM model that meets user requirements and can efficiently and accurately identify the gender of the character in the picture, thereby efficiently completing the construction of the target data processing model.

According to the method for constructing a data processing model provided in the present specification, by acquiring a model description parameter in a targeted manner, a server can accurately determine a modeling requirement of a user based on the model description parameter, automatically match the modeling requirement of the user to a suitable model as a base model, and then construct a corresponding data processing model, so that it is unnecessary for the user to test and analyze tediously to determine a suitable base model, thereby reducing the operational difficulty of the user and improving the processing efficiency.

Figure 5:
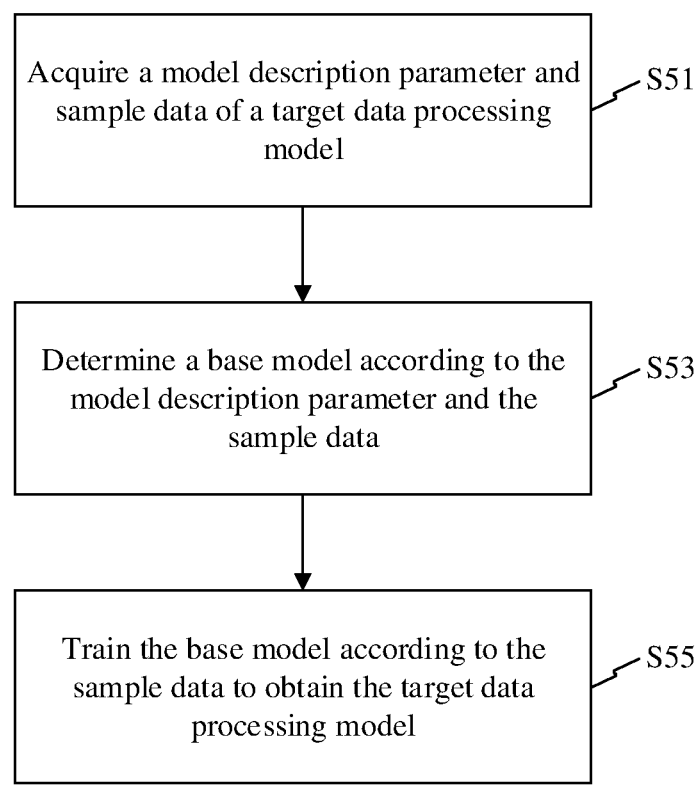
FIG. 5 is a flow chart of a method for constructing a data processing model according to an embodiment.

FIG. 5 is flow chart of a method for constructing a data processing model according to an embodiment. For example, the method is applied to a server side. Referring to FIG. 5, the method may include the following steps.

In step S51, a model description parameter and sample data of a target data processing model are acquired.

In an embodiment, the target data processing model may be a machine learning model to be constructed for performing target data processing. For example, the target data processing model may be a semantic recognition model for recognizing text data, a classification model for distinguishing different colors in picture data, or the like. The type and application of the target data processing model are not limited in the present specification.

In an embodiment, the model description parameter may be parameter data that is set by the user and is capable of effectively representing data processing requirements and/or user customization requirements of a target data processing model to be constructed.

In an embodiment, the model description parameter may include at least one of: a name of the target data processing model, a data label, a data feature, or an evaluation metric. The model description parameters listed above are only for illustrative purpose. Other types of parameters may also be used as the model description parameter according to specific application scenarios and user requirements. The present specification makes no limitation in this regard.

The name of the target data processing model may be an identification symbol of the data processing model that the user wants to construct, for example, an A model, a model for identifying the gender of a character in a picture, or the like. The data label may be a processing result obtained by the target data processing model by processing the target data. For example, it may be result data (e.g., corresponding to data of column y in the data processing model) predicted or identified by the data processing model. For example, it may be the result "male" or "female" obtained by identifying the gender of a character in a picture through the data processing model. The data feature may be a data feature used as a processing basis in the process of processing the target data by the target data processing model. For example, it may be a data feature extracted by the data processing model from the sample data and configured to obtain a prediction or identification result (e.g., corresponding to data of column x in the data processing model). For example, it may be a degree of thickness of the hair at the position of a human face in the picture, a bulging amplitude at the position of a human neck in the picture, a color value at the position of the human face in the picture, and so on. The above evaluation metric (also referred to as an evaluation parameter) may be a parameter capable of evaluating the performance, such as data processing precision and processing efficiency, of the target data processing model. For example, it may be an AUC parameter, accuracy, average accuracy, logarithmic loss function, precision-recall, confusion matrix, square root error, Quantiles of Errors, Almost Correct Predictions, and the like.

The sample data may be data of the same type as the to-be-processed target data. The sample data may be picture data, text data, or the like. The data type of the sample data is not limited in the present specification.

In step S53, a base model is determined according to the model description parameter and the sample data.

The base model may be referred to as an initial model for constructing the target data processing model. The base model may be a model structure (or an algorithm structure) with certain data processing and analysis capabilities. A target data processing model that meets user requirements and is capable of processing target data may be constructed through training and learning of the base model.

Different model structures may differ greatly when performing specific data processing. For example, some model structures are suitable for processing text data, while some model structures are suitable for processing picture data. Alternatively, some model structures are suitable for solving classification problems, while some model structures are suitable for solving regression problems. Therefore, determination of a base model that is suitable for target data processing and meets user requirements may have a relatively important influence on a use effect of the target data processing model to be subsequently constructed.

In order to avoid that the user tediously performs tests and analyses many times to find a suitable model to serve as the base model, the server may use the model description parameter set by the user as a processing basis, and automatically perform test analyses in conjunction with the sample data input by the user to search for a model (that is, a suitable model) that can perform target data processing and meet user requirements to serve as a data processing model.

In an embodiment, a model feature of the target data processing model to be constructed by the user may be determined according to the model description parameter; and then according to the model feature, the range is gradually narrowed down to filter a plurality of model structures to obtain a suitable model as a base model, which is provided for the user to construct a specific target data processing model.

In an embodiment, determining the base model according to the model description parameter and the sample data includes: determining a model type of the base model from a preset model type group according to the data label, wherein the preset model type group includes at least a classification type and a regression prediction type; selecting a plurality of models from models meeting the model type of the base model to serve as candidate models; establishing a pre-trained model for each of the plurality of candidate models according to the sample data and the data feature, and determining a model parameter of each pre-trained model; determining an adaptability of each pre-trained model according to the evaluation metric, wherein the adaptability is configured to represent a degree of applicability of data processing on the sample data based on a pre-trained model and a model parameter corresponding to the pre-trained model; and determining the base model from the plurality of candidate models according to the adaptabilities of the pre-trained models.

In step S55, the base model is trained according to the sample data to obtain the target data processing model.

In an embodiment, after the base model is determined, the base model may be further used as an initial model; and then the base model is trained using the sample data to construct a target data processing model that meets requirements. The determined base model may also be used for other applications according to a specific application scenario and a degree of technological development. The present specification makes no limitation in this regard.

In an embodiment, by separating the model description and the determination of the base model from the construction of the data processing model, the user can only provide a model description parameter, and the server can automatically perform the model description according to the model description parameter provided by the user and automatically determine a suitable base model which is provided for the user, so that the data processing model can be constructed based on the base model. Therefore, the user does not need to tediously search for a suitable base model by himself/herself, thereby reducing the burden of the user.

According to the method for constructing a data processing model provided in the present specification, by acquiring a model description parameter in a targeted manner, a server can accurately determine a modeling requirement of a user based on the model description parameter, automatically match the modeling requirement of the user to a suitable model as a base model, and then construct a corresponding data processing model, so that it is unnecessary for the user to test and analyze tediously to determine a suitable base model, thereby reducing the operational difficulty of the user and improving the processing efficiency.

In an embodiment, the model description parameter may include at least one of: a name of the target data processing model, a data label, a data feature, an evaluation metric, or the like. Other types of parameters may also be used as the model description parameter according to a specific situation. The present specification makes no limitation in this regard.

In an embodiment, the model description parameter may further include: a model type of the base model, a split rule of the sample data, a threshold parameter, and the like. For users with certain professional capabilities, such as engineers, setting permissions of more model parameters may be provided for the users to acquire more model parameters, so that a suitable model can be more quickly and accurately found based on more model parameters to serve as the base model of the target data processing model.

In an embodiment, determining the base model according to the model description parameter and the sample data may include the following steps.

In a first step, a model type of the base model is determined from a preset model type group according to the data label, wherein the preset model type group includes at least a classification type and a regression prediction type.

In an embodiment, determining the model type of the base model from the preset model type group according to the data label class may include analyzing the number of the data labels and a relationship between data of the data label and the data label to determine a type of target data processing to be performed by the target data processing model to be constructed; and then determining the type of the base model applicable to the target data processing according to the type of the target data processing.

In an embodiment, the model type may also be determined by analyzing the evaluation metric. In addition to the data label, a model type of the base model may also be determined from the preset model type group according to the evaluation metric, or a combination of the data label and the evaluation metric.

In an embodiment, the preset model type group includes at least a classification type, a regression prediction type, and the like. Each type may include a plurality of specific model structures. According to a specific application scenario and the development of technology, the preset model type group may also include other model types. The present specification makes no limitation in this regard.

In an embodiment, a model whose model type is a classification type is more suitable for data processing involving classification problems, and a model whose classification type is a regression prediction model is often more suitable for data processing involving prediction problems.

In a second step, a plurality of models are selected from models meeting the model type of the base model to serve as candidate models.

In an embodiment, the candidate models may include model structures that are suitable for target data processing (that is, meeting the model type of the base model) and may be used as the base model of the target data processing model. For example, the candidate models may be further tested and filtered subsequently to determine the base model from the candidate models.

In a third step, a pre-trained model is established for each of the plurality of candidate models according to the sample data and the data feature, and a model parameter of each pre-trained model is determined.

In an embodiment, the pre-trained model may be a relatively simple data processing model obtained based on the candidate models.

In an embodiment, the model parameter may include related operating parameters to be involved in the operation of the pre-trained models. For example, the model parameters may include: the number of times of iterations, a convergence condition, a running time, and so on, which is not limited in the present specification.

In an embodiment, establishing the pre-trained model for each of the plurality of candidate models according to the sample data and the data feature may include: extracting test data from the sample data; extracting feature data from the test data according to the data feature; and training each candidate model by using the feature data to obtain a pre-trained model corresponding to each candidate model.

The feature data may be part of the data that includes the data feature in the sample data. For example, the feature data may be data that represents the color of the human face in the picture.

In an embodiment, after the plurality of pre-trained models are obtained, model parameters corresponding to the pre-trained models may further be determined through a model parameter search according to the specific pre-trained models.

In a fourth step, an adaptability of each pre-trained model is determined according to the evaluation metric, wherein the adaptability is configured to represent a degree of applicability of data processing on the sample data based on a pre-trained model and a model parameter corresponding to the pre-trained model.

In an embodiment, the adaptability may be configured to represent a degree of applicability of a pre-trained model and a model parameter in the data processing on the sample data. In general, for a pre-trained model and a corresponding model parameter, the higher the adaptability value is, the higher the accuracy of the pre-trained model in the data processing on the target data based on the corresponding model parameter is, and the better the effect is. Correspondingly, the candidate model corresponding to the pre-trained model is also more effective in the data processing on the target data based on the above model parameter.

In an embodiment, determining an adaptability of each pre-trained model according to the evaluation metric may include the following: processing test data by using the pre-trained model and the corresponding model parameter respectively to obtain a data processing result to serve as a test result of each pre-trained model and the model parameter; conducting statistics on the evaluation metric of each pre-trained model according to the test result of each pre-trained model and the model parameter; and determining an adaptability of each pre-trained model and the model parameter according to a metric parameter of each pre-trained model. The adaptability of the pre-trained model may also be determined in other suitable manners according to specific situations and requirements. The present specification makes no limitation in this regard.

In a fifth step, the base model is determined from the plurality of candidate models according to the adaptabilities of the pre-trained models.

In an embodiment, determining the base model from the plurality of candidate models according to the adaptabilities of the pre-trained models may include: comparing the adaptabilities of the pre-trained models to determine a model corresponding to the pre-trained model with the highest adaptability as the base model of the target data processing model. It may also include: combining models corresponding to the plurality of pre-trained models whose adaptabilities are greater than a preset adaptability threshold to obtain a combined model; determining the combined model as the base model, and so on. The base model may also be determined according to the adaptabilities in other suitable manners depending on a specific situation. The present specification makes no limitation in this regard.

In an embodiment, selecting a plurality of models from models meeting the model type of the base model to serve as candidate models may include the following steps.

In a first step, data processing is performed on the sample data by using data processing models to which applied base models meet the model type of the base model in a preset data processing model library to obtain data processing results of the data processing models.

In a second step, statistics is conducted on evaluation metrics of the data processing models according to the data processing results of the data processing models.

In a third step, a data processing model in which a degree of difference between its evaluation metric and the evaluation metric of the target data processing model is less than a preset degree threshold is determined as a recommended model.

In a fourth step, a base model applied in the recommended model is determined as a candidate model.

In an embodiment, a variety of different trained data processing models are stored in the preset data processing model library. The preset data processing model library may acquire the latest trained data processing model after every preset time period to update the preset data processing model library.

The degree of difference between the evaluation metric of the trained data processing model and the evaluation metric of the target data processing model being less than a preset degree threshold may indicate that the evaluation metric of the data processing model is similar to or identical with the evaluation metric of the target data processing model. The preset degree threshold may be set flexibly according to the precision requirements. The present specification makes no limitation in this regard.

In an embodiment, the recommended model may be a trained data processing model of which applicable data processing is similar to or identical with the target data processing to be performed by the target data processing model to be constructed. Such a data processing model has a high reference value for constructing the target data processing model.

In an embodiment, the acquired sample data may be used as an input to be input into data processing models in a preset data processing model library, in which the applied base models meet the model type of the above base model, to obtain data processing results of the data processing models; evaluation metrics of the data processing models are obtained by conducting statistics according to the data processing results of the data processing models respectively; then a data processing model whose evaluation metric is identical with or similar to that of the target data processing model is found and determined as a recommended model by taking the evaluation metric of the target data processing model as a basis; and the model to which the recommended model is applied is determined as a candidate model, so that the candidate model with a better effect can be found more quickly and efficiently.

In an embodiment, in order to further reduce the number of the candidate models and improve the efficiency of determining the base model, the method may further include the following steps.

In a first step, a data type of the sample data is determined, wherein the data type of the sample data includes at least one of picture data or text data.

In a second step, a model type matching the data type of the sample data is filtered from the model types of the base models according to the data type of the sample data to serve as the model type of the base model.

In an embodiment, the data type of the sample data may include picture data, text data, image data, numeric data, and so on, which is not limited in the present specification.

Different model structures may be applicable to different data types. For example, some models may be suitable for processing image data, but not suitable for processing text data. Some models may be suitable for processing text data, but not suitable for processing numeric data. Therefore, in order to further reduce the number of the candidate models and more quickly determine a base model suitable for the target data processing, model types of base models may be further limited in conjunction with the data type of the sample data. For example, if a problem involved in data processing is a classification problem and the data type of the sample data is text data, the model type of the base model may be determined, by taking the above into account, as a classification type and a model type suitable for processing text data (that is, matching text data). In this way, the range of types of models that may be used as a base model may be further narrowed, so that the number of the candidate models acquired based on the model type of the base model can be reduced, and a suitable base model can be determined only by testing fewer candidate models subsequently. Thus, the objective of reducing the workload and improving the determination efficiency is achieved.

In an embodiment, establishing a pre-trained model for each of the plurality of candidate models according to the sample data and the data feature may include the following steps.

In a first step, a predetermined proportion of sample data is extracted from the sample data to serve as test data.

In an embodiment, part of the sample data may be randomly extracted from the sample data according to a preset proportion to serve as the test data. The preset proportion may be set flexibly according to a specific application scenario and precision requirements. For example, if the accuracy of the determined base model is intended to be improved, the proportion value may be increased to increase the amount of the test data. If the determination of the base model is intended to be sped up, the proportion value may be decreased to reduce the amount of the test data. The present specification makes no limitation in this regard.

In a second step, the test data is pre-processed to obtain processed test data, wherein the pre-processing includes: dimension reduction processing and/or cleaning processing.

In an embodiment, the pre-processing may include dimension reduction processing, cleaning processing, and the like. A suitable pre-processing manner may be selected according to specific application scenarios and requirements. For example, the sample data has a large amount of data and includes much information. Therefore, the test data may be pre-processed through dimension reduction processing to improve the efficiency of subsequent data processing. For another example, for some data processing with strong randomness, it is required that there should be no sequential connection between the sample data for training as far as possible. Therefore, the test data may be pre-processed by cleaning the data first to reduce a model error caused by an interrelation between the test data.

In a third step, feature data is selected from the processed test data according to the data feature.

In an embodiment, selecting feature data from the processed test data according to the data feature may include: extracting part of the data including the data feature from the processed test data to serve as the feature data (which may also be referred to as feature engineering).

In a fourth step, each of the plurality of candidate models is trained according to the feature data respectively to obtain the pre-trained model.

In an embodiment, the pre-trained model may be a data processing model obtained through a relatively simple training based on a candidate model and having certain data processing precision.

In an embodiment, training each of the plurality of candidate models according to the feature data respectively to obtain the pre-trained model may include: training the candidate models respectively by using the extracted feature data, so as to obtain a plurality of relatively simple pre-trained models. The pre-trained models each correspond to a candidate model.

In an embodiment, determining an adaptability of each pre-trained model according to the evaluation metric may include: performing a parameter search and a structure search according to the pre-trained model and the model parameter to obtain a search result; and determining an adaptability of the pre-trained model and the model parameter according to the search result and the evaluation metric.

In an embodiment, performing a parameter search and a structure search according to the pre-trained model and the corresponding model parameter may include: performing the parameter search and the structure search through at least one of the following algorithms: a Monte Carlo algorithm, a grid algorithm, a Bayesian algorithm, a genetic algorithm, and the like. The parameter search and the structure search may also be performed according to other algorithms depending on a specific application scenario and precision requirements. The present specification makes no limitation in this regard.

In an embodiment, determining the adaptability of the pre-trained model and the model parameter according to the search result and the evaluation metric may include: scoring each pre-trained model and the corresponding model parameter according to the search result of each pre-trained model and the model parameter as well as an evaluation metric set by the user, and taking the score value as the adaptability of the pre-trained model and the model parameter.

In an embodiment, determining the base model from the plurality of candidate models according to the adaptabilities of the pre-trained models may include: determining a model used by the pre-trained model with the highest adaptability in the pre-trained models as the base model.

In an embodiment, determining the base model from the plurality of candidate models according to the adaptabilities of the pre-trained models may further include: combining models used by a plurality of pre-trained models, whose adaptabilities are greater than a preset adaptability threshold (or whose adaptabilities are ranked at the top), in the pre-trained models to obtain a combined model; and determining the combined model as the base model. In this way, the advantages of a variety of different model structures with better effects can be synthesized to obtain a model structure that is more suitable for the target data processing to serve as a base model.

In an embodiment, the model description parameter may further include: a model type of the base model, a split rule of the sample data, and the like. The split rule of the sample data may include a preset proportion of the test data set by the user, a specified manner for splitting the sample data, and the like. In this way, more optional model description parameters can be provided for users with different professional capabilities for setting, so that personalized requirements of the users can be better met, and a base model and a model parameter can be determined more accurately and quickly.

According to the method for constructing a data processing model provided in the present specification, by acquiring a model description parameter in a targeted manner, a server can accurately determine a modeling requirement of a user based on the model description parameter, automatically match the modeling requirement of the user to a suitable model as a base model, and then construct a corresponding data processing model, so that it is unnecessary for the user to test and analyze tediously to determine a suitable base model, thereby reducing the operational difficulty of the user and improving the processing efficiency. In addition, the base model is determined by selecting a suitable candidate model according to a variety of features, such as the data label and the data type of the sample data, which eliminates some interference and reduces the workload, thereby further improving the processing efficiency.

Figure 6:
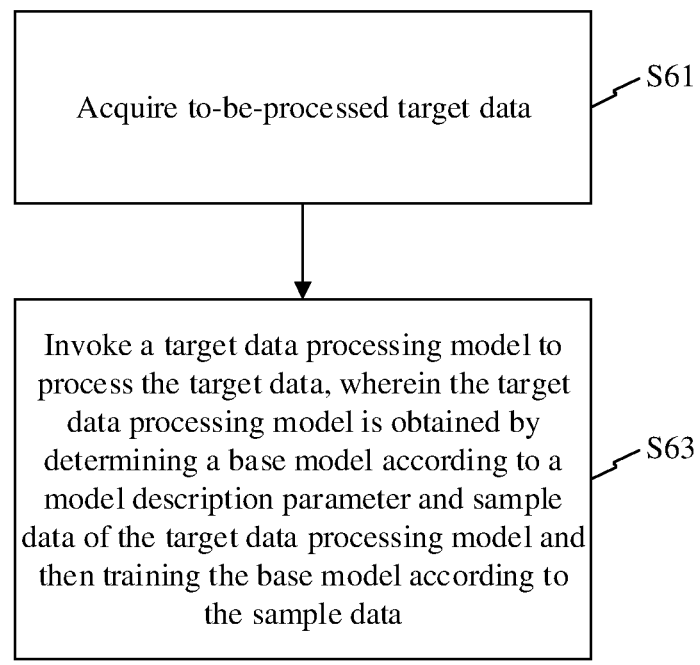
FIG. 6 is a flow chart of a data processing method according to an embodiment.

FIG. 6 is a flow chart of a data processing method according to an embodiment. The method may include the following steps.

In step S61, to-be-processed target data is acquired.

In an embodiment, the to-be-processed target data may be picture data to be classified, text data to be identified, image data to be predicted, or the like. The data type and data content of the to-be-processed target data are not limited in the present specification.

In step S63, a target data processing model is invoked to process the target data, wherein the target data processing model is obtained by determining a base model according to a model description parameter and sample data of the target data processing model that are acquired and then training the base model according to the sample data.

In an embodiment, the target data processing model is a data processing model constructed in a manner that a server obtains, according to a model description parameter set and sample data input by a user in advance and through matching, a suitable model suitable for target data processing and meeting user requirements to serve as a base model; and then performs training and learning on the base model by using the sample data.

In an embodiment, invoking the target data processing model to process the target data may include: taking the target data as an input, and inputting the target data into the target data processing model; and performing, by the target data processing model, corresponding data processing of the target data processing model to obtain a corresponding data processing result. For example, a picture including a character is input into a target data processing model capable of identifying the gender of the character in the picture; and the target data processing model performs corresponding data processing on the picture to obtain a data processing result as follows: the character in the picture is a female, thereby completing data processing on target data.

Figure 7:
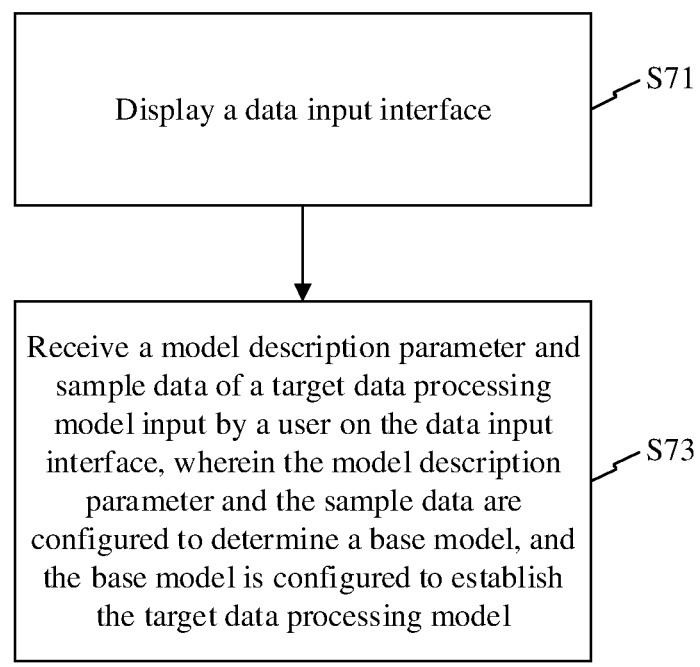
FIG. 7 is a flow chart of a data processing method according to an embodiment.

FIG. 7 is a flow chart of a data processing method according to an embodiment. The method may be applied to a user terminal to acquire a model description parameter of a target data processing model. The method may include the following steps.

In step S71, a data input interface is displayed.

In an embodiment, the data input interface may be an image input interface as shown in FIG. 2, a code input interface (that is, a code template provided for the user to set definitions), or the like. The specific form of the data input interface is not limited in the present specification.

In an embodiment, the user may also input a model parameter of the target data processing model through a command-line interaction such as presto (a distributed SQL query engine) and ipython-notebook (a Python-based programming tool), or an input interface incorporated into an API or a program.

In step S73, a model description parameter and sample data of a target data processing model input by a user on the data input interface are received, wherein the model description parameter and the sample data are configured to determine a base model, and the base model is configured to establish the target data processing model.

In existing methods for constructing a data processing model, model description, determination of a base model, and model training and construction are mixed together, and as a result, during the implementation, the existing methods are inflexible, are not easy to expand, are not friendly enough to developers, are incapable of tracking the entire development process, cannot perform flexible help control and code review by means of a version management tool, such as git, and are not easy to update a new solution model for a certain problem. That is, the existing methods are relatively difficult for the user to operate, and are not convenient and friendly enough.

In order to solve the above problems, a model description parameter may be defined in advance through language definition, so that a user can input or set, in a targeted manner, a specific model description parameter that meets target data processing and user customization requirements. A machine may follow a certain syntax rule to acquire the specific model description parameter set by the user and generate a corresponding execution file, such as a code program, and then automatically find a suitable base model according to the model description parameter set by the user in the execution file and provide it to the user; and then train the found base model to construct a specific target data processing model, thereby separating the model description and the determination of the base model from the model training and construction, reducing the difficulty in and complexity of constructing the data processing model, and improving the user experience.

In an embodiment, the model description parameter may be defined in a Structured Query Language (SQL) according to a certain syntax rule (for example, by way of keywords). For example, code for definition about a model description parameter is generated, and then a corresponding data input interface is displayed to the user based on the code for definition, so as to receive the model description parameter set by the user. The model description parameter may also be defined in other languages or syntax rules according to a specific situation. The present specification makes no limitation in this regard.

In an embodiment, the model description parameter may include: a name of the target data processing model, a data label, a data feature, an evaluation metric, and the like, and corresponding keywords are model_name, label, feature, eval_metrics, and the like, which is not limited in the present specification.

In an embodiment, a definition may be made in the following manner to obtain code for definition including a model description parameter: TRAIN model_name [[BY model_type] [WITH params]] [FOLD number] [PARTITION partition_fields]<br/>SELECT [LABEL label_names]<br/>EVAL eval_metrics [SELECT]<br/> [TIME time_limit].

The above code for definition includes four parts, that is, a training part, a data part, an evaluation part, and a computation limiting condition part.

The above TRAIN model_name [[BY model_type] [WITH params]] [FOLD number] [PARTITION partition_fields]<br/> is used to define the training part, where [ ] represents an optional part, TRAIN represents a keyword of the training part, and model_name represents a model name generated by training; BY is used to specify a model type model_type for training; WITH is used to specify model parameters params; FOLD is used to specify a value number of the layer k-fold; and PARTITION is used to specify data field partition_fields for partitioning. The meaning of the above <br/> will be understood by one of ordinary skill in the art, such as HTML 5. This may be expressed as a common description, such as dividing a problem into a plurality of sub-problems and dividing a model into sub-models.

The above SELECT [LABEL label_names]<br/> is used to define the data part, where H represents an optional part, SELECT represents the use of one or more data fields, and LABEL is used to specify one or more labels label_names. For example, a first data field may be used as a label LABEL by default. If there is more than one LABEL, label_names <br/> may be specified using LABEL.

The above EVAL eval_metrics [SELECT]<br/> is used to define the evaluation part, where H represents an optional part, and EVAL is used to specify an evaluation metric eval_metrics. If different data is used for evaluation, an evaluation data part <br/> may be further added to the evaluation part.

The above [TIME time_limit] is used to define the computation limiting condition part, where H represents an optional part, and TIME is used to specify a time limit for the completion of model training. For example, TIME may be used to specify a time limit for the completion of model training; and if the time limit is not specified, it can be completely processed by the system.

Further, in consideration of offline computing for the training model, the above code for definition may also include an offline computing part, which is expressed as: <br/>SCORE mode_name TO table_name INDEX Index_list (create a table/insert with index list)<br/>SELECT<br/>. <br/>SCORE is used to select a trained model name; mode_name TO is used to define a data table table_name stored after the computing; INDEX is used to define an index field Index_list of the data table, and the index fields may also appear in the SELECT part; and <br/>SELECT is used to define data for offline computing.

For example, it may be required that the non-LABEL field of the training model be exactly the same after removal of the INDEX part.

Further, in consideration of online computing for the training model, the above code for definition may also include an online computing part, which is expressed as: <br/>DEPLOY model_name WITH params<br/>. DEPLOY is used to deploy the training model model_name as an interface service (for example, rest api), and WITH is used to add a corresponding parameter configuration params according to requirements of a data center. The <br/> language may be expanded by nesting to a situation where a plurality of models are combined.

The code for definition listed above is only for illustrative purpose. The specific description of the language may be evolving or changing. For example, the following forms may also be described:
CREATE TABLE model1 AS
SELECT
model_train (features [, labels][, options]) FROM source_table1;
CREATE TABLE predict1 ASSELECT model_predict (model1 [, options]) FROM source_table2.

In an embodiment, for the image input interface, as shown in FIG. 2, the model description parameter and the sample data of the target data processing model may be acquired by receiving data information in each data field. For example, a data label set by the user may be acquired through a data label field in the data input interface, a data feature set by the user may be acquired through a data feature field, an evaluation metric set by the user may be acquired through an evaluation metric field, a model name of the target data processing model may be acquired through a name field of the target data processing model, and sample data input by the user may be acquired through a sample data input interface.

In an embodiment, for the code input interface, the model description parameter of the target data processing model may be acquired by receiving a character string set by the user at a preset position in the code input interface, and the corresponding sample data at a specified position is acquired by receiving a preset code instruction triggered by the user.

For example, the user may define or set a specific character string at a preset position in the above code input interface to serve as the model description parameter. For example, the user terminal may receive, through the SELECT instruction, a character string set by the user in the underlined position of "TRAIN model_name" in the code input interface to serve as the model name of the target data processing model; receive, through the SELECT instruction, a character string set by the user in the underlined position of "LABEL label_names" to serve as the data label of the target data processing model; and receive, through the SELECT instruction, a character string set by the user in the underlined position of "EVAL eval_metrics" to serve as the evaluation metric of the target data processing model. The acquisition of other model description parameters may be obtained with reference to the above implementation.

In an embodiment, after acquiring the model description parameter and the sample data in the above manner, the user terminal may send the model description parameter and the sample data to the server in the form of an execution file such as code. The server may acquire the model description parameter set by the user by parsing (SQL-based parsing) the execution file such as code; determine a base model according to the model description parameter set by the user;

and then train the base model according to the sample data to obtain the target data processing model.

In an embodiment, when the server receives an execution file such as code including model description parameters, the server may correspondingly divide the execution file into four parts for analysis and processing.

The first part is a training part. For example, a keyword TRAIN may be used to extract model_name to serve as a model name of a data processing model generated by training; which model_types (that is, model types) are used for training may be specified using a keyword BY; parameters params of a related model may be specified using a keyword WITH, wherein the model parameter may specify the value of k-fold by using FOLD described by Json; and data fields partition_fields for partitioning may be specified using a keyword PARTITION.

The second part is a data part. For example, a first data field may be used as a label LABEL by default through a SQL syntax by using a keyword SELECT. For example, if there is more than one LABEL, label_names are specified using LABEL.

The third part is an evaluation part. For example, an evaluation metric eval_metrics may be specified using a keyword EVAL. If different data is used for evaluation, an evaluation data part may be further added to the evaluation part.

The fourth part is a computation limiting condition part. For example, a time limit for the completion of model training may be specified using a keyword TIME. If the user does not set a time limit, it may be completely processed by the server.

Further, for the server, a trained model may also be used for offline computing in the following manner: CORE mode_name TO table_name INDEX Index_list<br/>SELECT<br I>. The offline computing of the model may be, e.g., divided into two parts: SCORE is used to select a trained model name mode_name; TO is used to define a data table stored after the computing; and INDEX is used to define an index field of the data table, wherein the index fields may also appear in the SELECT part. SELECT is used to define data for offline computing, which is required to be, after removal of the INDEX part, exactly the same as the non-label field of the training model. The online computing of the model may be performed in the following manner: DEPLOY model_name WITH params deploys the model into a rest api service, and WITH adds a corresponding parameter configuration params according to requirements of a data center.

In this way, the server may acquire the model description parameter set by the user through parsing, so that a suitable base model can be automatically determined subsequently by using the model description parameter.

In an embodiment, in consideration of some users with relatively strong professional capabilities, they may be provided with more freedom and authority to set model description parameters, so that the server can more quickly and accurately determine a suitable base model. Therefore, after receiving the model description parameter and the sample data of the target data processing model input by the user on the data input interface, the method may further include: displaying, in response to a display operation, an execution file generated based on the model description parameter; and receiving a modification operation on the execution file, and updating the execution file according to the modification operation.

The execution file may be specific program code. The execution file may include model description parameters and other model setting parameters automatically generated based on the model description parameters.

The data input interface may include a display key or an instruction for displaying an execution file. The user may send the display operation by clicking the above display key or invoking the instruction of displaying an execution file. Then, the user terminal displays the corresponding execution file after receiving the display operation from the user.

The user may directly perform a modification operation on the model description parameters and other model setting parameters included in the execution file. The user terminal may receive a modification operation of a user on an execution file, update the execution file according to the modification operation of the user, and send the updated execution file to a server, so that the server can more quickly and accurately determine a base model according to the execution file modified by the user to construct a target data processing model.

A server is further provided in an embodiment of the present specification, including a processor and a memory for storing processor-executable instructions, wherein the processor may perform the above described methods according to the instructions, including, e.g., acquiring a model description parameter and sample data of a target data processing model; determining a base model according to the model description parameter and the sample data; and training the base model according to the sample data to obtain the target data processing model.

Figure 8:
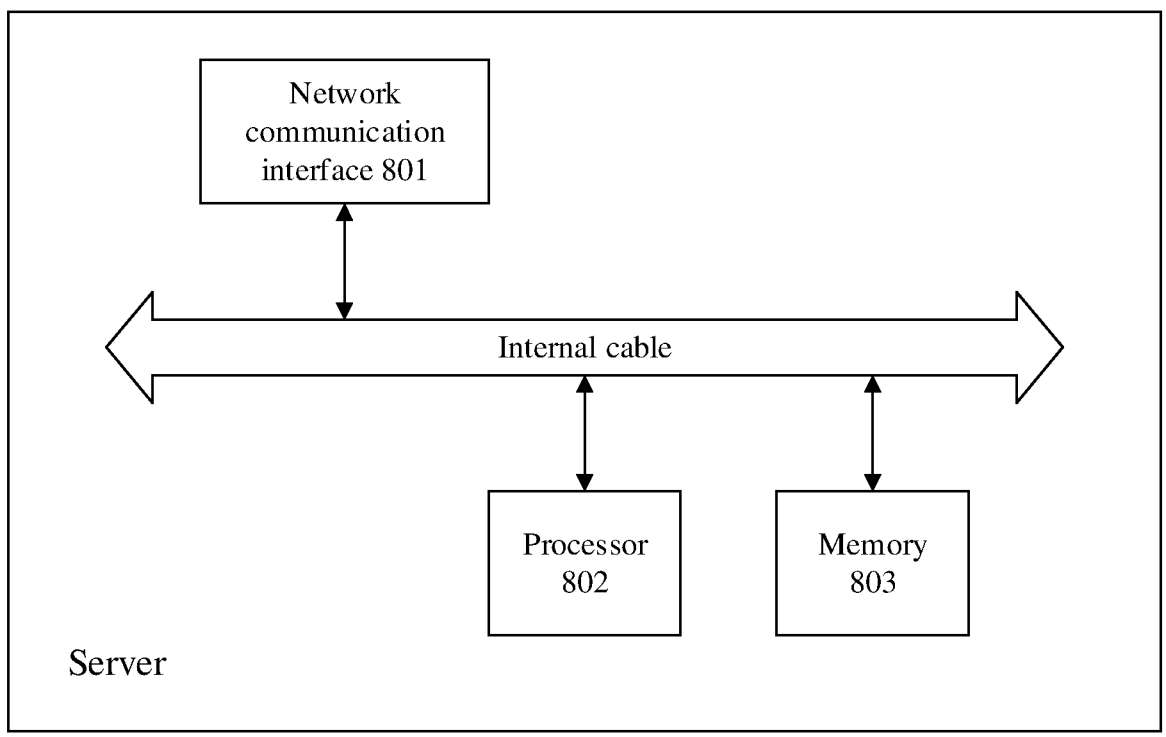
FIG. 8 is a schematic diagram of a server according to an embodiment.

FIG. 8 is a schematic diagram of a server according to an embodiment. Referring to FIG. 8, the server includes a network communication port 801, a processor 802, and a memory 803, which are connected to each other by internal cables to perform specific data interaction.

Network communication port 801 may be configured to acquire a model description parameter and sample data of a target data processing model.

Processor 802 may be configured to determine a base model according to the model description parameter and the sample data; and train the base model according to the sample data to obtain the target data processing model.

Memory 803 may be configured to store the acquired model description parameter and sample data, as well as intermediate data generated by processor 902, and store a corresponding instruction program.

In an embodiment, network communication port 801 may be a virtual port that is bound to different communication protocols so that different data can be sent or received. For example, network communication port 801 may be port 80 responsible for web data communication, port 21 responsible for FTP data communication, or port 25 responsible for mail data communication. In addition, network communication port 801 may also be a physical communication interface or a communication chip. For example, it may be a wireless mobile network communication chip, such as GSM, CDMA, or the like; or a WiFi chip; or a Bluetooth chip.

In an embodiment, processor 802 may be implemented in any suitable manner. For example, processor 802 may be in the form of, for example, a microprocessor or processor and a computer-readable medium storing computer-readable program code (such as software or firmware) executable by the (micro)processor, a logic gate, a switch, an Application Specific Integrated Circuit (ASIC), a programmable logic controller, an embedded micro-controller, or the like. The present specification makes no limitation thereto.

In an embodiment, memory 803 may include a plurality of levels. In a digital system, any device may be a memory as long as it can store binary data. In an integrated circuit, a circuit that has a storage function but does not have a physical form may also be referred to as a memory, such as a RAM or a FIFO; in the system, a storage device in a physical form may also be referred to as a memory, such as a memory bank and a TF card.

A user terminal is further provided in an embodiment of the present specification, including a processor and a memory for storing processor-executable instructions, wherein the processor may perform the above described methods according to the instructions, including, e.g., displaying a data input interface; and receiving a model description parameter and sample data of a target data processing model input by a user on the data input interface, wherein the model description parameter and the sample data are configured to determine a base model, and the base model is configured to establish the target data processing model.

Figure 9:
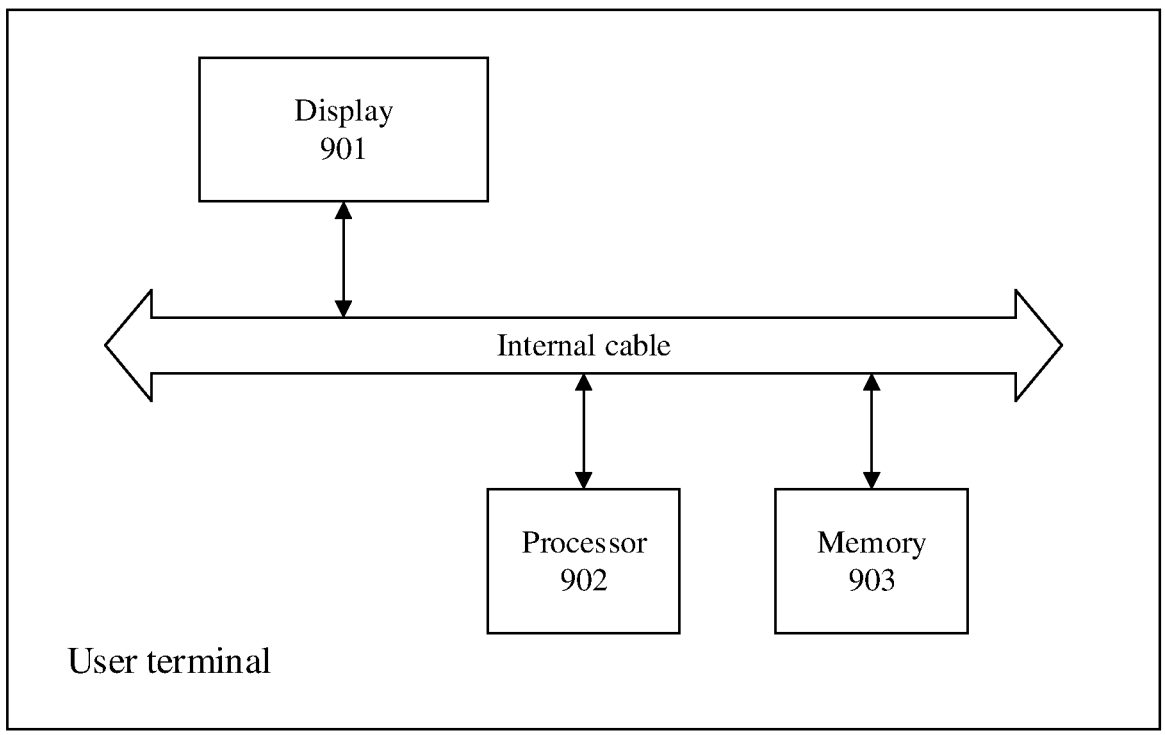
FIG. 9 is a schematic diagram of a user terminal according to an embodiment.

FIG. 9 is a schematic diagram of a user terminal according to an embodiment. Referring to FIG. 9, the user terminal includes a display 901, a processor 902, and a memory 903, which are connected to each other by internal cables to perform specific data interaction.

Display 901 may be configured to display a data input interface.

Processor 902 may be configured to receive a model description parameter and sample data of a target data processing model input by a user on the data input interface, wherein the model description parameter and the sample data are configured to determine a base model, and the base model is configured to establish the target data processing model.

Memory 903 may be configured to store a corresponding instruction program.

In an embodiment, display 901 may be a display tool that displays a certain electronic file on a screen through a specific transmission device. Display 901 may include a liquid crystal display (LCD) screen, a cathode ray tube (CRT) display screen, a light-emitting diode (LED) display screen, and the like.

A non-transitory computer-readable storage medium is further provided in an embodiment of the present specification. The storage medium stores computer program instructions thereon, wherein, when the computer program instructions are executed, the above described data processing methods may be performed, including, e.g., acquiring a model description parameter and sample data of a target data processing model; determining a base model according to the model description parameter and the sample data; and training the base model according to the sample data to obtain the target data processing model.

The storage medium includes, but is not limited to, a Random Access Memory (RAM), a Read-Only Memory (ROM), a Cache, a Hard Disk Drive (HDD), or a Memory Card. The memory may be configured to store computer program instructions.

Figure 10:
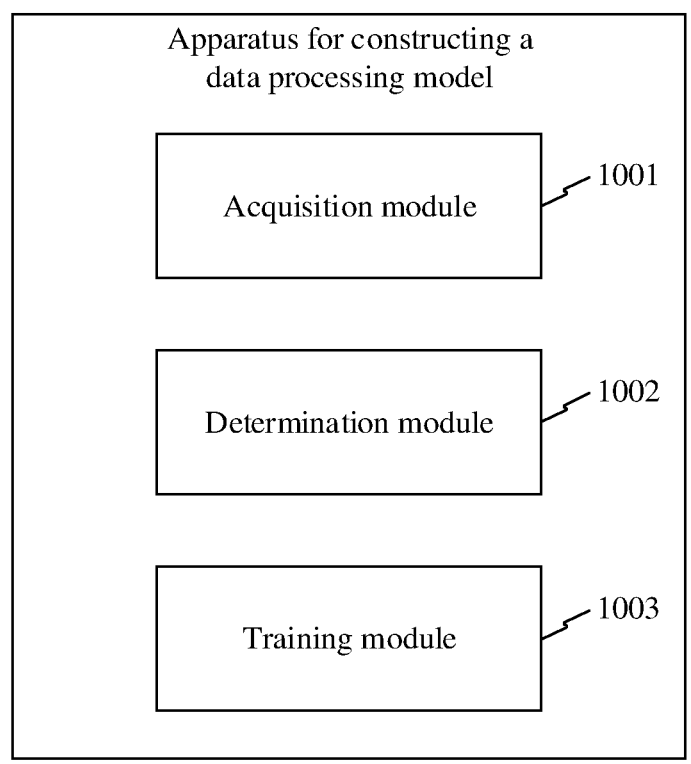
FIG. 10 is a schematic diagram of an apparatus for constructing a data processing model according to an embodiment.

FIG. 10 is a schematic diagram of an apparatus for constructing a data processing model according to an embodiment. The apparatus may include: an acquisition module 1001 configured to acquire a model description parameter and sample data of a target data processing model; a determination module 1002 configured to determine a base model according to the model description parameter and the sample data; and a training module 1003 configured to train the base model according to the sample data to obtain the target data processing model.

In an embodiment, the model description parameter may include at least one of: a name of the target data processing model, a data label, a data feature, an evaluation metric, or the like. Other types of parameters may also be used as the model description parameter. The present specification makes no limitation in this regard.

In an embodiment, determination module 1002 may include the following units: a first determination unit configured to determine a model type of the base model from a preset model type group according to the data label, wherein the preset model type group includes at least a classification type and a regression prediction type; a selection unit configured to select a plurality of models from models meeting the model type of the base model to serve as candidate models; an establishment unit configured to establish a pre-trained model for each of the plurality of candidate models according to the sample data and the data feature, and determine a model parameter of each pre-trained model; a second determination unit configured to determine an adaptability of each pre-trained model according to the evaluation metric, wherein the adaptability is configured to represent a degree of applicability of data processing on the sample data based on a pre-trained model and a model parameter corresponding to the pre-trained model; and a third determination unit configured to determine the base model from the plurality of candidate models according to the adaptabilities of the pre-trained models.

In an embodiment, the selection unit may include the following sub-units: a processing sub-unit configured to process the sample data by using data processing models in a preset data processing model library whose base models meet the model type of the base model to obtain data processing results of the data processing models; a statistics sub-unit configured to conduct statistics on evaluation metrics of the data processing models according to the data processing results of the data processing models; a first determination sub-unit configured to determine a data processing model in which a degree of difference between its evaluation metric and the evaluation metric of the target data processing model is less than a preset degree threshold as a recommended model; and a second determination sub-unit configured to determine a base model to which the recommended model is applied as a candidate model.

In an embodiment, the establishment unit may include the following sub-units: an extraction sub-unit configured to extract a preset proportion of sample data from the sample data to serve as test data; a pre-processing sub-unit configured to pre-process the test data to obtain processed test data, wherein the pre-processing includes: dimension reduction processing and/or cleaning processing; a selection sub-unit configured to select feature data from the processed test data according to the data feature; and a training sub-unit configured to train each of the plurality of candidate models according to the feature data respectively to obtain the pre-trained model.

In an embodiment, the third determination unit may include: a third determination sub-unit configured to determine a model used by the pre-trained model with the highest adaptability as the base model.

In an embodiment, the third determination unit may further include: a fourth determination sub-unit configured to combine models used by the plurality of pre-trained models whose adaptabilities are greater than a preset adaptability threshold to obtain a combined model; and determine the combined model as the base model.

In an embodiment, the model description parameter may further include: a model type of the base model, a split rule of the sample data, and the like. In this way, more optional model description parameters can be provided for users with different professional capabilities, so that a base model and a model parameter can be more accurately and quickly determined.

It should be noted that the units, apparatuses, or modules illustrated in the above embodiments may be implemented by a computer chip or an entity, or implemented by a product having a certain function. For ease of description, when the above apparatus is described, it is divided into various modules based on functions for separate description. The functions of the modules may be implemented in one or more pieces of software and/or hardware, or the modules that implement the same function may be implemented by a combination of multiple sub-modules or sub-units. The apparatus embodiments described above are only schematic. For example, the division of the units is only a division of logical functions. In actual implementations, there may be other division manners. For example, a plurality of units or components may be combined or integrated into another system, or some features can be not included or not implemented. In addition, the displayed or discussed mutual coupling or direct coupling or communication connection may be indirect coupling or communication connection through some interfaces, apparatuses, or units, and may be in electrical, mechanical, or other forms.

According to the apparatus for constructing a data processing model provided in the embodiment of the present specification, an acquisition module acquires a model description parameter in a targeted manner, a determination module accurately determines a modeling requirement of a user based on the model description parameter and automatically matches the modeling requirement of the user to a suitable model as a base model, and then a training model constructs a corresponding data processing model, so that it is unnecessary for the user to test and analyze tediously to determine a suitable base model, thereby reducing the operational difficulty of the user and improving the processing efficiency.

Although the present specification provides method operation steps as described in the embodiments or flowcharts, more or fewer operation steps may be included. The sequence of steps listed in the embodiments is only one of many sequences of execution of the steps, which does not represent a unique sequence of execution. When executed by an apparatus or client terminal product, the steps may be executed sequentially according to the method shown in the embodiments or the drawings or in parallel (for example, a parallel processor or multi-thread processing environment, or even a distributed data processing environment). The terms "comprise," "include," or any other variations thereof are intended to cover non-exclusive inclusion, so that a process, method, product, or device including a series of elements not only includes the elements, but also includes other elements not clearly listed, or further includes elements inherent to the process, method, product, or device. Without more restrictions, it is not excluded that there are other identical or equivalent elements in the process, method, product, or device including the elements. Words such as first and second are used to indicate names, and do not indicate any particular order.

Those skilled in the art will understand that, in addition to implementing a controller in the form of pure computer-readable program code, the method steps may be logically programmed to enable the controller to realize the same function in the form of a logic gate, a switch, a special integrated circuit, a programmable logic controller, an embedded micro-controller, or the like. Therefore, such a controller can be regarded as a hardware component, and apparatuses included therein for realizing various functions can also be regarded as a structure within the hardware component.

In some embodiments, the above described methods may be implemented in a general context of computer-executable instructions executed by a computer, such as a program module. Generally, the program module includes a routine, a program, an object, an assembly, a data structure, a class, and the like used for executing a specific task or implementing a specific abstract data type. The above described methods may also be implemented in distributed computing environments. In the distributed computing environments, tasks are executed by remote processing devices that are linked through a communication network. In the distributed computing environments, the program module may be located in local and remote computer storage media including a storage device.

In some embodiments, the above described methods may be implemented in the form of a software product. The computer software product may include a storage medium (such as a ROM/RAM, a magnetic disk, or an optical disc), and include instructions used for causing a computer device (which may be a personal computer, a mobile terminal, a server, a network device, or the like) to execute the methods.

The embodiments in the present specification are described in a progressive manner, and for the same or similar parts between the embodiments, reference can be made to each other. The above described methods may be used in many general-purpose or special-purpose computer system environments or configurations, for example: a personal computer, a server computer, a handheld device or portable device, a tablet device, a multiprocessor system, a microprocessor-based system, a set-top box, a programmable electronic device, a network PC, a minicomputer, a mainframe computer, a distributed computing environment including any of the above systems or devices.

Although the present specification has been described with reference to the embodiments, those of ordinary skills in the art will understand that the present specification has many variations and changes without departing from the spirit of the present specification, and the appended claims cover these variations and changes.

The invention claimed is:

1. A method for constructing a data processing model, comprising:
    acquiring model description parameters and sample data of a target data processing model, wherein the model description parameters comprise a name of the target data processing model, a data label, a data feature, and an evaluation metric;
    determining a base model according to the model description parameters and the sample data; and
    training the base model according to the sample data to obtain the target data processing model,
    wherein determining the base model according to the model description parameters and the sample data comprises:
    determining a model type of the base model from a preset model type group according to the data label, wherein the preset model type group comprises at least a classification type and a regression prediction type;
    selecting a plurality of models from models meeting the model type of the base model to serve as a plurality of candidate models;

establishing a pre-trained model for each of the plurality of candidate models according to the sample data and the data feature, and determining a model parameter of each pre-trained model;

determining an adaptability of each pre-trained model according to the evaluation metric, wherein the adaptability of a pre-trained model is configured to represent a degree of applicability of data processing on the sample data based on the pre-trained model and a model parameter corresponding to the pre-trained model; and determining the base model from the plurality of candidate models according to the adaptabilities of the pre-trained models.

2. The method of claim 1, wherein selecting the plurality of models from models meeting the model type of the base model to serve as the plurality of candidate models comprises:

processing the sample data by using data processing models of which applied base models meet the model type of the base model in a preset data processing model library, to obtain data processing results of the data processing models;

conducting statistics on evaluation metrics of the data processing models according to the data processing results of the data processing models;

determining a data processing model from the data processing models as a recommended model, a degree of difference between an evaluation metric of the determined data processing model and the evaluation metric of the target data processing model is less than a preset degree threshold; and determining a base model applied in the recommended model as a candidate model.

3. The method of claim 1, wherein after determining the model type of the base model from the preset model type group according to the data label, the method further comprises:

determining a data type of the sample data, wherein the data type of the sample data comprises at least one of picture data or text data; and selecting, according to the data type of the sample data and through filtering model types of base models, a model type matching the data type of the sample data to serve as the model type of the base model.

4. The method of claim 1, wherein establishing the pre-trained model for each of the plurality of candidate models according to the sample data and the data feature comprises:

extracting a preset proportion of sample data from the sample data to serve as test data;

pre-processing the test data to obtain processed test data, wherein the pre-processing comprises at least one of dimension reduction processing or cleaning processing;

selecting feature data from the pre-processed test data according to the data feature; and training each of the plurality of candidate models according to the feature data to obtain the pre-trained model.

5. The method of claim 1, wherein determining the adaptability of each pre-trained model according to the evaluation metric comprises:

performing a parameter search and a structure search according to the pre-trained model and a corresponding model parameter to obtain a search result; and determining the adaptability of the pre-trained model according to the search result and the evaluation metric.

6. The method of claim 5, wherein performing the parameter search and the structure search according to the pre-trained model and the corresponding model parameter to obtain the search result comprises:

performing the parameter search and the structure search through at least one of: a Monte Carlo algorithm, a grid algorithm, a Bayesian algorithm, or a genetic algorithm.

7. The method of claim 1, wherein determining the base model from the plurality of candidate models according to the adaptabilities of the pre-trained models comprises:

determining a model used by the pre-trained model with a highest adaptability as the base model.

8. The method of claim 7, wherein determining the base model from the plurality of candidate models according to the adaptabilities of the pre-trained models further comprises:

combining models used by the plurality of pre-trained models whose adaptabilities are greater than a preset adaptability threshold to obtain a combined model; and determining the combined model as the base model.

9. The method of claim 1, wherein the model description parameters further comprise: a model type of the base model, and a split rule of the sample data.

10. A device, comprising:

a processor; and a memory storing instructions executable by the processor, wherein the processor is configured to:

acquire model description parameters and sample data of a target data processing model, wherein the model description parameters comprise a name of the target data processing model, a data label, a data feature, and an evaluation metric;

determine a base model according to the model description parameters and the sample data; and train the base model according to the sample data to obtain the target data processing model, wherein in determining the base model according to the model description parameters and the sample data, the processor is further configured to:

determine a model type of the base model from a preset model type group according to the data label, wherein the preset model type group comprises at least a classification type and a regression prediction type;

select a plurality of models from models meeting the model type of the base model to serve as a plurality of candidate models;

establish a pre-trained model for each of the plurality of candidate models according to the sample data and the data feature, and determine a model parameter of each pre-trained model;

determine an adaptability of each pre-trained model according to the evaluation metric, wherein the adaptability of a pre-trained model is configured to represent a degree of applicability of data processing on the sample data based on the pre-trained model and a model parameter corresponding to the pre-trained model; and determine the base model from the plurality of candidate models according to the adaptabilities of the pre-trained models.

11. The device of claim 10, wherein in selecting the plurality of models from models meeting the model type of the base model to serve as the plurality of candidate models, the processor is further configured to:
- process the sample data by using data processing models of which applied base models meet the model type of the base model in a preset data processing model library, to obtain data processing results of the data processing models;
- conduct statistics on evaluation metrics of the data processing models according to the data processing results of the data processing models;
- determine a data processing model from the data processing models as a recommended model, a degree of difference between an evaluation metric of the determined data processing model and the evaluation metric of the target data processing model is less than a preset degree threshold; and
- determine a base model applied in the recommended model as a candidate model.

12. The device of claim 10, wherein after determining the model type of the base model from the preset model type group according to the data label, the processor is further configured to:
- determine a data type of the sample data, wherein the data type of the sample data comprises at least one of picture data or text data; and
- select, according to the data type of the sample data and through filtering model types of base models, a model type matching the data type of the sample data to serve as the model type of the base model.

13. The device of claim 10, wherein in establishing the pre-trained model for each of the plurality of candidate models according to the sample data and the data feature, the processor is further configured to:
- extract a preset proportion of sample data from the sample data to serve as test data;
- pre-process the test data to obtain processed test data, wherein the pre-processing comprises at least one of dimension reduction processing or cleaning processing;
- select feature data from the pre-processed test data according to the data feature; and
- train each of the plurality of candidate models according to the feature data to obtain the pre-trained model.

14. The device of claim 10, wherein in determining the adaptability of each pre-trained model according to the evaluation metric, the processor is further configured to:
- perform a parameter search and a structure search according to the pre-trained model and a corresponding model parameter to obtain a search result; and
- determine the adaptability of the pre-trained model according to the search result and the evaluation metric.

15. The device of claim 14, wherein in performing the parameter search and the structure search according to the pre-trained model and the corresponding model parameter to obtain the search result, the processor is further configured to:
- perform the parameter search and the structure search through at least one of: a Monte Carlo algorithm, a grid algorithm, a Bayesian algorithm, or a genetic algorithm.

16. A non-transitory computer-readable storage medium having stored thereon instructions that, when executed by a processor of a device, cause the device to perform a method for constructing a data processing model, the method comprising:
- acquiring model description parameters and sample data of a target data processing model, wherein the model description parameters comprise a name of the target data processing model, a data label, a data feature, and an evaluation metric;
- determining a base model according to the model description parameters and the sample data; and
- training the base model according to the sample data to obtain the target data processing model,
- wherein determining the base model according to the model description parameters and the sample data comprises:
- determining a model type of the base model from a preset model type group according to the data label, wherein the preset model type group comprises at least a classification type and a regression prediction type;
- selecting a plurality of models from models meeting the model type of the base model to serve as a plurality of candidate models;
- establishing a pre-trained model for each of the plurality of candidate models according to the sample data and the data feature, and determining a model parameter of each pre-trained model;
- determining an adaptability of each pre-trained model according to the evaluation metric, wherein the adaptability of a pre-trained model is configured to represent a degree of applicability of data processing on the sample data based on the pre-trained model and a model parameter corresponding to the pre-trained model; and
- determining the base model from the plurality of candidate models according to the adaptabilities of the pre-trained models.

* * * * *